United States Patent
Kakinuma et al.

(10) Patent No.: US 10,066,081 B2
(45) Date of Patent: *Sep. 4, 2018

(54) POLYMERIZABLE COMPOSITION FOR OPTICAL MATERIALS

(71) Applicant: MITSUI CHEMICALS, INC., Minato-ku, Tokyo (JP)

(72) Inventors: Naoyuki Kakinuma, Omuta (JP); Toshiya Hashimoto, Ichihara (JP); Kouya Kojima, Urayasu (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/103,326

(22) PCT Filed: Dec. 12, 2014

(86) PCT No.: PCT/JP2014/083016
§ 371 (c)(1),
(2) Date: Jun. 10, 2016

(87) PCT Pub. No.: WO2015/088015
PCT Pub. Date: Jun. 18, 2015

(65) Prior Publication Data
US 2016/0304701 A1   Oct. 20, 2016

(30) Foreign Application Priority Data

Dec. 13, 2013   (JP) ................... 2013-258501
Feb. 27, 2014   (WO) ............... PCT/JP2014/054971
Aug. 26, 2014   (JP) ................... 2014-171791

(51) Int. Cl.
| | |
|---|---|
| *G02B 1/04* | (2006.01) |
| *C08K 5/3475* | (2006.01) |
| *C08G 18/72* | (2006.01) |
| *C08G 18/73* | (2006.01) |
| *C08G 18/75* | (2006.01) |
| *C08G 18/76* | (2006.01) |
| *C08G 18/38* | (2006.01) |
| *G02B 5/20* | (2006.01) |
| *G02B 5/22* | (2006.01) |

(52) U.S. Cl.
CPC ........ *C08K 5/3475* (2013.01); *C08G 18/3876* (2013.01); *C08G 18/722* (2013.01); *C08G 18/73* (2013.01); *C08G 18/755* (2013.01); *C08G 18/758* (2013.01); *C08G 18/7642* (2013.01); *G02B 1/041* (2013.01); *G02B 5/208* (2013.01); *G02B 5/223* (2013.01)

(58) Field of Classification Search
CPC ............. C08K 5/3475; C08G 18/3876; C08G 18/722; C08G 18/73; C08G 18/755; C08G 18/758; C08G 18/7642; G02B 1/041; G02B 5/208; G02B 5/223

See application file for complete search history.

(56) References Cited

U.S. PATENT DOCUMENTS

| | | | |
|---|---|---|---|
| 4,689,387 A | 8/1987 | Kajimoto et al. | |
| 4,716,234 A | 12/1987 | Dunks et al. | |
| 4,775,733 A | 10/1988 | Kanemura et al. | |
| 5,087,758 A | 2/1992 | Kanemura et al. | |
| 5,191,055 A | 3/1993 | Kanemura et al. | |
| 5,608,115 A | 3/1997 | Okazaki et al. | |
| 5,804,674 A | 9/1998 | Yamana et al. | |
| 5,837,797 A | 11/1998 | Okazaki et al. | |
| 5,952,096 A | 9/1999 | Yamashita et al. | |
| 6,100,362 A | 8/2000 | Okazaki et al. | |
| 6,142,624 A | 11/2000 | Morris et al. | |
| 6,187,844 B1 | 2/2001 | Murata | |
| 8,097,190 B2 | 1/2012 | Jang et al. | |
| 2003/0170467 A1 | 9/2003 | Cornelius et al. | |
| 2008/0094704 A1 | 4/2008 | Kimura et al. | |
| 2009/0029172 A1 | 1/2009 | Isozaki | |
| 2009/0225425 A1* | 9/2009 | Jang .................... | C08G 18/3876 359/581 |
| 2010/0292430 A1* | 11/2010 | Ryu .................... | C08G 18/3876 528/60 |
| 2012/0225996 A1* | 9/2012 | Kawato .................... | B29C 33/60 524/590 |
| 2014/0039145 A1 | 2/2014 | Jang et al. | |
| 2014/0107314 A1* | 4/2014 | Kawato .............. | C08G 18/7642 528/226 |

(Continued)

FOREIGN PATENT DOCUMENTS

| | | |
|---|---|---|
| CN | 101702039 B * | 2/2011 |
| EP | 2 757 115 A1 | 7/2014 |

(Continued)

OTHER PUBLICATIONS

CN-101702039-B Feb. 2011 English Translation.*
International Search Report (PCT/ISA/210) dated Feb. 24, 2015 Patent Office as the International Searching Authority for International Application No. PCT/JP2014/083016.
Written Opinion (PCT/ISA/237) dated Feb. 24, 2015, by the Japanese Patent Office as the International Searching Authority for International Application No. PCT/JP2014/083016.
International Search Report (PCT/ISA/210) dated Feb. 24, 2015 Patent Office as the International Searching Authority for International Application No. PCT/JP2014/083014.

(Continued)

*Primary Examiner* — Michael L Leonard
(74) *Attorney, Agent, or Firm* — Buchanan, Ingersoll & Rooney PC

(57) ABSTRACT

There is provided a polymerizable composition for optical materials including (A) at least one kind of polythiols selected from 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, (B) polyisocyanate, and (C) at least one kind of ultraviolet absorbers having a maximum absorption peak in a range of 350 nm to 370 nm.

5 Claims, No Drawings

(56) References Cited

U.S. PATENT DOCUMENTS

| | | | |
|---|---|---|---|
| 2015/0119546 A1* | 4/2015 | Greszta-Franz | G02B 1/04 528/85 |
| 2015/0370094 A1* | 12/2015 | Hashimoto | G02B 5/208 351/159.62 |
| 2016/0215121 A1* | 7/2016 | Kousaka | C08K 5/3475 |

FOREIGN PATENT DOCUMENTS

| | | | |
|---|---|---|---|
| EP | 2963457 A1 | 1/2016 | |
| JP | 60-199016 A | 10/1985 | |
| JP | 63-046213 A | 2/1988 | |
| JP | 2-270859 A | 11/1990 | |
| JP | 5-072504 A | 3/1993 | |
| JP | 7-252207 A | 10/1995 | |
| JP | 8-003267 A | 1/1996 | |
| JP | 8-120178 A | 5/1996 | |
| JP | 9-110955 A | 4/1997 | |
| JP | 9-194536 A | 7/1997 | |
| JP | 9-263694 A | 10/1997 | |
| JP | 10-186291 A | 7/1998 | |
| JP | 11-218602 A | 8/1999 | |
| JP | 11-295502 A | 10/1999 | |
| JP | H11-271501 A | 10/1999 | |
| JP | 2000-147201 A | 5/2000 | |
| JP | 2004-504481 A | 2/2004 | |
| JP | 2004-124062 A | 4/2004 | |
| JP | 2004-513388 A | 4/2004 | |
| JP | 2004-345123 A | 12/2004 | |
| JP | 2004-352828 A | 12/2004 | |
| JP | 2005-281527 A | 10/2005 | |
| JP | 2005-292240 A | 10/2005 | |
| JP | 2008-105225 A | 5/2008 | |
| JP | 2010-234563 A | 10/2010 | |
| JP | 2012-173704 A | 9/2012 | |
| JP | 2012-242718 A | 12/2012 | |
| JP | WO 2012176439 A1 * | 12/2012 | C08G 18/7642 |
| JP | 2013-060488 A | 4/2013 | |
| JP | 2014-508207 A | 4/2014 | |
| KR | 10-0689867 B1 | 2/2007 | |
| KR | 10-2011-0063847 A | 6/2011 | |
| WO | WO 02/037169 A1 | 5/2002 | |
| WO | WO 2006/087880 A1 | 8/2006 | |
| WO | WO 2009/098887 A1 | 8/2009 | |
| WO | WO 2011/055540 A1 | 5/2011 | |
| WO | WO 2012/118351 A2 | 9/2012 | |
| WO | WO 2013/039114 A1 | 3/2013 | |
| WO | WO 2014/133111 A1 | 9/2014 | |

OTHER PUBLICATIONS

Written Opinion (PCT/ISA/237) dated Feb. 24, 2015, by the Japanese Patent Office as the International Searching Authority for International Application No. PCT/JP2014/083014.

Lilla Knels et al., "Blue Light Stress in Retinal Neuronal (R28) Cells Is Dependent on Wavelength Range and Irradiance", European Journal of Neuroscience, vol. 34, pp. 548-558, 2011.

Notification of Reasons for Refusal issued by the Japanese Patent Office in related Japanese Patent Application No. 2015-552543 dated Apr. 11, 2017 (6 pages including partial English translation).

CIBA: The Optical Brighteners (Uvitex OB) product catalog, Ciba Special Chemicals, Apr. 1999, Switzerland.

T.R. Crompton: "The Determination of Ultraviolet Stabilisers in Extractants", GlobalSpec [Online], Feb. 9, 2017.

CIBA: "TINUVIN 328", Nov. 2008.

Office Action issued by the Korean Patent Office in corresponding Korean Patent Application No. 10-2015-7021391 dated Feb. 22, 2017 (7 pages).

Office Action issued by the Japanese Patent Office in corresponding Japanese Patent Application No. 2015-503034 dated Mar. 21, 2017 (5 pages including partial English translation).

Extended Search Report issued by the European Patent Office in corresponding European Application No. 14869657.8 dated Jul. 4, 2017 (7 pages).

Notification of Reasons for Refusal issued by the Korean Intellectual Property Office in corresponding Korean Patent Application No. 10-2016-7014908 dated Jun. 14, 2017 (13 pages including partial English translation).

Decision for Refusal issued by the Japanese Patent Office in related Japanese Patent Application No. 2015-552543 dated Nov. 7, 2017 (5 pages including partial English translation).

Notification of Reason for Refusal issued by the Korean Intellectual Property Office in corresponding Korean Patent Application No. 10-2016-7014908 dated Dec. 7, 2017 (15 pages including partial English translation).

* cited by examiner

POLYMERIZABLE COMPOSITION FOR OPTICAL MATERIALS

TECHNICAL FIELD

The present invention relates to a polymerizable composition for optical materials that supplies a thiourethane-based molded product, an optical material obtained from the composition, and a process for producing the same.

BACKGROUND ART

Since plastic lenses are light, not easily cracked, and can be stained in comparison to inorganic lenses, plastic lenses have been rapidly distributed as optical elements such as eyeglass lenses and camera lenses. Hitherto, various resins for lenses have been developed and used, and, among these resins, a typical example is a thiourethane-based molded product obtained using a polymerizable composition including a polyisocyanate and a thiol compound. The thiourethane-based molded product is one of optical materials having high refraction, low dispersion, and excellent impact resistance (refer to Patent Documents 1 to 4).

On the other hand, in the related art, the adverse effects due to exposure of the eye to ultraviolet rays having a wavelength of 380 nm to 400 nm have been an issue. Furthermore, in recent years, effects on the eye such as eye strain or pain by blue light having a wavelength of about 420 nm included in light emitted from natural light, liquid crystal displays of office equipment, or displays of portable devices such as a smart phone or a mobile phone have been an issue, and thus, it is required to reduce the amount at which the eye is exposed to light from ultraviolet rays to blue light having a wavelength of about 420 nm.

The effects of blue light having a wavelength of about 420 nm on the eye are described in Non-Patent Document 1. In Non-Patent Document 1, damage of retinal nerve cells (cultured retinal nerve R28 cells of a rat) due to irradiation with blue LED light having different peak wavelengths of 411 nm and 470 nm is verified. As a result, while irradiation ($4.5\ W/m^2$) with blue light having a peak wavelength of 411 nm causes cell death of retinal nerve cells within 24 hours, in blue light having a peak wavelength of 470 nm, it is shown that changes in the cells do not occur even in the case of the same amount of irradiation. That is, it is shown that it is important to suppress the exposure of blue light having a wavelength of 400 nm to 420 nm to prevent eye disability.

In addition, there is concern that eye strain or stress occurs due to exposure of irradiation with blue light to the eye for a long period of time, and this is considered to be a factor that causes age-related macular degeneration (refer to Non-Patent Document 1).

In Patent Documents 5 to 7, a plastic lens including an ultraviolet absorber such as a benzotriazole-based compound is disclosed.

A thiourethane-based molded product configuring a plastic lens is obtained by curing a polymerizable composition which has a polyisocyanate and a thiol compound as main components, and various thiol compounds have been proposed in the related art. In Patent Documents 8 and 9, it is described that by using a thiol compound and a polyisocyanate, a thiourethane-based molded product having a high refractive index and low dispersion is obtained.

In the documents, as a thiol compound, a thiol compound (polythiol A3) including 4-mercaptomethyl-1,8-dimercapto-3,6-dithiaoctane (hereinafter, referred to as a polythiol B) or 5,7-dimercaptomethyl-1,11-dimercapto-3,6,9-trithiaundecane (polythiol A1), 4,7-dimercaptomethyl-1,11-dimercapto-3,6,9-trithiaundecane (polythiol A2), and 4,8-dimercaptomethyl-1,11-dimercapto-3,6,9-trithiaundecane (hereinafter, one of the polythiols A1, A2, A3 or a mixture of two or more kinds thereof is referred to as a polythiol A) is exemplified.

The values of optical properties such as a refractive index and an Abbe number of the thiourethane-based molded product obtained from the polythiol A and a polyisocyanate are substantially the same as those of the thiourethane-based molded product obtained from the polythiol B and the same polyisocyanate (Patent Document 9).

RELATED DOCUMENT

Patent Document

[Patent Document 1] Japanese Unexamined Patent Publication No. 60-199016
[Patent Document 2] Japanese Unexamined Patent Publication No. 63-046213
[Patent Document 3] Japanese Unexamined Patent Publication No. 08-003267
[Patent Document 4] Japanese Unexamined Patent Publication No. 09-110955
[Patent Document 5] Japanese Unexamined Patent Publication No. 10-186291
[Patent Document 6] Japanese Unexamined Patent Publication No. 11-218602
[Patent Document 7] Japanese Unexamined Patent Publication No. 11-295502 [Patent Document 8] Japanese Unexamined Patent Publication No. 02-270859
[Patent Document 9] Japanese Unexamined Patent Publication No. 07-252207

Non-Patent Literature

[Non-Patent Document 1] The European journal of neuroscience, vol. 34, Iss. 4, 548-58, (2011)

SUMMARY OF THE INVENTION

It is considered that the amount of an ultraviolet absorber added is increased to effectively block blue light having a wavelength of about 420 nm. However, in some cases, the solubility of the ultraviolet absorber in the polymerizable composition is reduced, bleeding out of the ultraviolet absorber from the molded product occurs, or the desired effects are not exhibited even in the case of increasing the amount of the ultraviolet absorber added. In addition, in some cases, problems occur in the color, the transparency, and the like of the obtained molded product. Thus, regardless of the amount of the ultraviolet absorber added, a material effectively suppressing transmission of blue light having a wavelength of about 420 nm has been required.

The present inventors performed intensive studies on the combination of a polyisocyanate and a thiol compound, in particular, the kind of thiol compound, to solve the above-described problems.

As described in Patent Document 9, the polythiol A and polythiol B which are thiol compounds have similar structural units in the resin, and the values of optical properties such as a refractive index and an Abbe number of a thiourethane-based molded product obtained by combining the same polyisocyanate are substantially the same, and thus, the optical properties are thought to be substantially the same.

However, as a result of the study, the inventors found that the molded product obtained from a polymeric composition including the polythiol A, a polyisocyanate, and a specific ultraviolet absorber suppresses transmission of blue light having a wavelength of about 420 nm and other properties thereof are also excellent, and completed the present invention.

That is, they found that the molded product obtained from a polymeric composition including the polythiol A, a polyisocyanate, and a specific ultraviolet absorber effectively suppresses transmission of blue light having a wavelength of about 420 nm, compared to a molded product obtained by using the polythiol B. Furthermore, they found that the molded product is a molded product without causing any practical problem in transparency, heat resistance, and mechanical properties, and completed the present invention.

That is, the present invention is as follows.

[1] A polymerizable composition for optical materials including (A) at least one kind of polythiols selected from 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, (B) polyisocyanate, and (C) at least one kind of ultraviolet absorbers having a maximum absorption peak in a range of 350 nm to 370 nm.

[2] The polymerizable composition for optical materials according to [1], in which the ultraviolet absorber (C) is a benzotriazole-based compound.

[3] The polymerizable composition for optical materials according to [2], in which the benzotriazole-based compound is a chloro-substituted benzotriazole-based compound.

[4] The polymerizable composition for optical materials according to [3], in which the chloro-substituted benzotriazole-based compound is 2-(2-hydroxy-3-t-butyl-5-methylphenyl)-chlorobenzotriazole.

[5] The polymerizable composition for optical materials according to any one of [1] to [4], in which 0.1% by weight to 1.5% by weight of the ultraviolet absorber (C) is included in 100% by weight of the polymerizable composition for optical materials.

[6] A molded product obtained by heat-curing the polymerizable composition for optical materials according to any one of [1] to [5].

[7] An optical material comprised of the molded product according to [6].

[8] A plastic lens comprised of the optical material according to [7].

[9] A process for producing optical materials including a step of cast-polymerizing the polymerizable composition for optical materials according to any one of [1] to [5].

According to the polymerizable composition for optical materials of the present invention, it is possible to provide a resin or an optical material effectively suppressing transmission of blue light having a wavelength of about 420 nm and it is possible to reduce the effects of harmful light on the eye and suppress disorders such as eye strain or stress. Furthermore, optical materials obtained using the polymerizable composition for optical materials of the present invention are excellent in terms of optical characteristics such as a refractive index, releasability, transparency, and heat resistance, and are also excellent in terms of balance among the above characteristics.

DESCRIPTION OF EMBODIMENTS

Hereinafter, the polymerizable composition for optical materials of the present invention will be described with reference to an embodiment.

<Polymerizable Composition for Optical Materials>

The polymerizable composition for optical materials of the present embodiment includes (A) at least one kind of polythiols selected from 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, (B) polyisocyanate, and (C) at least one kind of ultraviolet absorbers having a maximum absorption peak in a range of 350 nm to 370 nm.

The polymerizable composition for optical materials of the present embodiment will be described using specific examples, but the present invention is not limited to the following exemplified compounds. In addition, the exemplified compounds may be used alone or in combination of a plurality of the compounds.

[Polythiol (A)]

The polythiol (A) is a compound including at least one kind selected from 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

The polythiol (A) can be prepared by a known method. For example, the polythiol (A) can be prepared by the method described in Example 5 of WO2007/129450.

In the present embodiment, thiol compounds (hereinafter, referred to as other thiol compounds) other than the polythiol (A) may be included within a range not impairing the effects of the present invention.

Examples of the thiol compounds other than the polythiol (A) include an aliphatic thiol compound and an aromatic thiol compound.

Examples of the aliphatic thiol compound include methane dithiol, 1,2-ethane dithiol, 1,2-propane dithiol, 1,3-propane dithiol, 1,4-butane dithiol, 1,5-pentane dithiol, 1,6-hexane dithiol, 1,2-cyclohexane dithiol, 3,4-dibutoxybutane-1,2-dithiol, 2-methylcyclohexane-2,3-dithiol, 1,2-dimercaptopropyl methyl ether, 2,3-dimercaptopropyl methyl ether, bis(2-mercaptoethyl) ether, tetrakis(mercaptomethyl) methane, bis(mercaptomethyl) sulfide, bis(mercaptomethyl) disulfide, bis(mercaptoethyl) sulfide, bis(mercaptoethyl) disulfide, bis(mercaptomethylthio) methane, bis(2-mercaptoethylthio) methane, 1,2-bis(mercaptomethylthio) ethane, 1,2-bis(2-mercaptoethylthio) ethane, 1,3-bis(mercaptomethylthio) propane, 1,3-bis(2-mercaptoethylthio) propane, 1,2,3-tris(mercaptomethylthio) propane, 1,2,3-tris(2-mercaptoethylthio) propane, 1,2,3-tris(3-mercaptopropylthio) propane, 1,1,3,3-tetrakis(mercaptomethylthio) propane, 4,6-bis(mercaptomethylthio)-1,3-dithiane, 2-(2,2-bis(mercaptomethylthio)ethyl)-1,3-dithietane, tetrakis(mercaptomethylthiomethyl) methane, tetrakis(2-mercaptoethylthiomethyl) methane, bis(2,3-dimercaptopropyl) sulfide, 2,5-dimercapto-1,4-dithiane, ethylene glycol bis(2-mercaptoacetate), ethylene glycol bis(3-mercaptopropionate), diethylene glycol (2-mercaptoacetate), diethylene glycol (3-mercaptopropionate), 2,3-dimercapto-1-propanol (3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerin tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethyl sulfide bis(2- mercaptoacetate), hydroxymethyl sulfide bis(3-mercaptopropionate), hydroxyethyl sulfide (2-mercaptoacetate), hydroxyethyl sulfide (3-mercaptopropionate), hydroxymethyl disulfide (2-mercaptoacetate), hydroxymethyl disulfide (3-mercaptopropionate), thioglycolic acid bis(2-mercaptoethylester), thiodipropionic acid bis(2-mercaptoethylester), and 4-mercaptomethyl-1,8-dimercapto-3,6-dithiaoctane.

Examples of the aromatic thiol compound include 1,2-dimercaptobenzene, 1,3-dimercaptobenzene, 1,4-dimercaptobenzene, 1,2-bis(mercaptomethyl) benzene, 1,4-bis(mercaptomethyl) benzene, 1,2-bis(mercaptoethyl) benzene, 1,4-bis(mercaptoethyl) benzene, 1,2,3-trimercaptobenzene, 1,2,4-trimercaptobenzene, 1,3,5-trimercaptobenzene, 1,2,3-tris(mercaptomethyl) benzene, 1,2,4-tris(mercaptomethyl) benzene, 1,3,5-tris(mercaptomethyl) benzene, 1,2,3-tris(mercaptoethyl) benzene, 1,3,5-tris(mercaptoethyl) benzene, 1,2,4-tris(mercaptoethyl) benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl) benzene, 1,2,3,5-tetrakis(mercaptomethyl) benzene, 1,2,4,5-tetrakis(mercaptomethyl) benzene, 1,2,3,4-tetrakis(mercaptoethyl) benzene, 1,2,3,5-tetrakis(mercaptoethyl) benzene, 1,2,4,5-tetrakis(mercaptoethyl) benzene, 2,2'-dimercaptobiphenyl, and 4,4'-dimercaptobiphenyl.

Among these exemplified compounds, the aliphatic thiol compound and the aliphatic thiol compound having an ester bond are preferable, and pentaerythritol tetrakis(3-mercaptopropionate), 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, pentaerythritol tetrakis(2-mercaptoacetate), and ethylene glycol bis(3-mercaptopropionate) are more preferable, and pentaerythritol tetrakis(3-mercaptopropionate) is particularly preferable.

[Polyisocyanate (B)]

The polyisocyanate (B) is a compound having at least two or more isocyanate groups in the molecule. The polyisocyanate (B) may include a sulfur atom in the molecule. The polyisocyanate (B) may be a dimer, a trimer, or a prepolymer.

Examples of the polyisocyanate (B) in the present embodiment include an aliphatic polyisocyanate compound, an alicyclic polyisocyanate compound, an aromatic polyisocyanate compound, a sulfur-containing aliphatic polyisocyanate compound, and a sulfur-containing aromatic polyisocyanate compound.

Examples of the aliphatic polyisocyanate compound include hexamethylene diisocyanate, 2,2-dimethylpentane diisocyanate, 2,2,4-trimethylhexane diisocyanate, 2,4,4-trimethyl hexamethylene diisocyanate, 1,6,11-undecatriisocyanate, 1,3,6-hexamethylene triisocyanate, 1,8-diisocyanato-4-isocyanatomethyl octane, bis(isocyanatoethyl) carbonate, and bis(isocyanatoethyl) ether.

Examples of the alicyclic polyisocyanate compound include isophorone diisocyanate, 1,2-bis(isocyanatomethyl) cyclohexane, 1,3-bis(isocyanatomethyl) cyclohexane, 1,4-bis(isocyanatomethyl) cyclohexane, bis(4-isocyanatocyclohexyl) methane, cyclohexane diisocyanate, methyl cyclohexane diisocyanate, 2,2-bis(4-isocyanatocyclohexyl) propane, 2,5-bis(isocyanatomethyl)-bicyclo[2.2.1]heptane, 2,6-bis(isocyanatomethyl)-bicyclo[2.2.1]heptane, 3,8-bis(isocyanatomethyl) tricyclodecane, 3,9-bis(isocyanatomethyl) tricyclodecane, 4,8-bis(isocyanatomethyl) tricyclodecane, and 4,9-bis(isocyanatomethyl) tricyclodecane.

Examples of the aromatic polyisocyanate compound include o-xylylene diisocyanate, m-xylylene diisocyanate, p-xylylene diisocyanate, bis(isocyanatoethyl) benzene, bis(isocyanatopropyl) benzene, bis(isocyanatomethyl) naphthalene, naphthalene diisocyanate, m-phenylene diisocyanate, p-phenylene diisocyanate, 2,4-tolylene diisocyanate, 2,6-tolylene diisocyanate, biphenyl diisocyanate, benzene triisocyanate, and 4,4'-diphenylmethane diisocyanate.

Examples of the sulfur-containing aliphatic polyisocyanate compound include bis(isocyanatoethyl) sulfide, bis(isocyanatopropyl) sulfide, bis(isocyanatomethyl) sulfone, bis(isocyanatomethyl) disulfide, bis(isocyanatopropyl) disulfide, bis(isocyanatomethylthio) methane, bis(isocyanatomethylthio) ethane, bis(isocyanatoethylthio) methane, bis(isocyanatoethylthio) ethane, and 1,5-diisocyanato-2-isocyanatomethyl-3-thiapentane.

Examples of the sulfur-containing aromatic polyisocyanate compound include bis(3-isocyanatophenyl) sulfide, bis(4-isocyanatophenyl) sulfide, bis(3-isocyanatomethylphenyl) sulfide, bis(4-isocyanatomethylphenyl) sulfide, bis(3-isocyanatomethylbenzyl) sulfide, bis(4-isocyanatomethylbenzyl) sulfide, bis(3-isocyanatophenyl) disulfide, bis(4-isocyanatophenyl) disulfide, bis(3-isocyanatomethylphenyl) disulfide, and bis(4-isocyanatomethylphenyl) disulfide.

Among these exemplified compounds, an aliphatic polyisocyanate compound, an alicyclic polyisocyanate compound, or an aromatic polyisocyanate compound is preferable.

Specifically, m-xylylene diisocyanate, 2,4-tolylene diisocyanate, 2,6-tolylene diisocyanate, 4,4'-diphenylmethane diisocyanate, 2,5-bis(isocyanatomethyl)-bicyclo[2.2.1] heptane, 2,6-bis(isocyanatomethyl)-bicyclo[2.2.1] heptane, bis(4-isocyanatocyclohexyl) methane, 1,3-bis(isocyanatomethyl) cyclohexane, 1,4-bis(isocyanatomethyl) cyclohexane, hexamethylene diisocyanate, or isophorone diisocyanate is preferable, m-xylylene diisocyanate, 2,5-bis(isocyanatomethyl)-bicyclo[2.2.1] heptane, 2,6-bis(isocyanatomethyl)-bicyclo[2.2.1] heptane, hexamethylene diisocyanate, or isophorone diisocyanate is more preferable, and 2,5-bis(isocyanatomethyl)-bicyclo[2.2.1] heptane, 2,6-bis(isocyanatomethyl)-bicyclo[2.2.1] heptane, hexamethylene diisocyanate, or isophorone diisocyanate is particularly preferable.

[Ultraviolet Absorber (C)]

The ultraviolet absorber (C) is not particularly limited as long as the maximum absorption wavelength thereof when dissolved in a chloroform solution is in a range of 350 nm to 370 nm.

Examples of the ultraviolet absorber (C) include a benzophenone-based compound, a triazine compound, and a benzotriazole-based compound.

Examples of the benzophenone-based compound include 2,2'-dihydroxy-4,4'-dimethoxybenzophenone and 2,2'-4,4'-tetrahydroxybenzophenone.

Examples of the triazine compound include ADEKA-STAB LA-F70 manufactured by ADEKA CORPORATION and TINUVIN400 manufactured by BASF SE.

In the present embodiment, a benzotriazole-based compound is preferably used, and examples of the benzotriazole-based compound include a linear alkyl ester addition benzotriazole-based compound and a chloro-substituted benzotriazole-based compound.

Among these, the chloro-substituted benzotriazole-based compound is preferable. More preferably, 2-(2-hydroxy-3- t-butyl-5-methylphenyl)-chlorobenzotriazole is exemplified, and examples of the commercially available products include TINUVIN326 manufactured by BASF SE, SEESEORB703 manufactured by SHIPRO KASE KAISHA LTD., Viosorb550 manufactured by KYODO CHEMICAL CO., LTD., and KEMISORB73 manufactured by CHEMIPRO KASEI KAISHA LTD. By the ultraviolet absorber (C) being one kind selected from chloro-substituted benzotriazole-based compounds, it is possible to more effectively suppress transmission of blue light having a wavelength of about 420 nm and it is possible to obtain an optical material in which the effects of harmful light on the eye are reduced and disorders such as eye strain or stress are suppressed.

In the present embodiment, as the ultraviolet absorber (C), at least one kind of these ultraviolet absorbers are preferably used, and the ultraviolet absorber (C) may contain two or more different ultraviolet absorbers. Moreover, the ultraviolet absorbers configuring the ultraviolet absorber (C) have the maximum absorption peak in a range of 350 nm to 370 nm.

In the present embodiment, in addition to the ultraviolet absorber (C), a compound of which the maximum absorption wavelength is not in a range of 350 nm to 370 nm may be used in combination.

0.1% by weight to 1.5% by weight of the ultraviolet absorber (C) can be included, preferably 0.3% by weight to 1.3% by weight thereof can be included, and more preferably 0.4% by weight to 1.2% by weight thereof can be included, in 100% by weight of the polymerizable composition for optical materials. In the above range, it is possible to effectively suppress transmission of blue light having a wavelength of about 420 nm.

Moreover, since the amount of other additives in the present embodiment is small, 100% by weight of the polymerizable composition for optical materials can also be "the total of 100% by weight of the polythiol (A), the polyisocyanate (B), and the ultraviolet absorber (C)" or "the total of 100% by weight of the polythiol (A), other thiol compounds, the polyisocyanate (B), and the ultraviolet absorber (C)".

In the present embodiment, the molar ratio of the mercapto groups in the thiol compound to the isocyanate groups in the polyisocyanate is in a range of 0.8 to 1.2, preferably in a range of 0.85 to 1.15, and more preferably in a range of 0.9 to 1.1. In the above range, optical materials, particularly, resins preferably used as plastic lens materials for eyeglasses can be obtained.

(Other Components)

The polymerizable composition for optical materials of the present embodiment may further include a polymerization catalyst, an internal mold release agent, a resin modifier, a photostabilizer, and a bluing agent, as other components.

(Catalyst)

Examples of the catalyst include a Lewis acid, an amine, an organic acid, and an amine organic acid salt, and a Lewis acid, an amine, or an amine organic acid salt is preferable, and dimethyl tin chloride, dibutyl tin chloride, or dibutyl tin laurate is more preferable.

(Internal Mold Release Agent)

An acidic phosphoric ester can be used as the internal mold release agent. Examples of the acidic phosphoric ester include a phosphoric monoester and a phosphoric diester, and the acidic phosphoric ester can be used alone or in a mixture of two or more kinds thereof.

For example, ZelecUN manufactured by Stepan Company, an internal mold release agent for MR manufactured by Mitsui Chemicals, Inc., JP series manufactured by JOHOKU CHEMICAL CO., LTD., Phosphanol series manufactured by TOHO CHEMICAL INDUSTRY CO., LTD., and AP and DP Series manufactured by DAIHACHI CHEMICAL INDUSTRY CO., LTD. can be used.

(Resin Modifier)

For the purpose of adjusting various physical properties of the obtained resin, such as optical properties, impact resistance, and specific gravity, and adjusting handleability of the polymerizable composition, a resin modifier can be added to the polymerizable composition for optical materials of the present embodiment within a range not impairing the effects of the present invention.

Examples of the resin modifier include olefin compounds and the like including an episulfide compound, an alcohol compound, an amine compound, an epoxy compound, an organic acid and an anhydride thereof, or a (meth)acrylate compound.

(Photostabilizer)

As the photostabilizer, a hindered amine-based compound can be used. Examples of the commercially available products of the hindered amine-based compound include Lowilite76 and Lowilite92 manufactured by Chemtura Corporation, TINUVIN144, TINUVIN292, and TINUVIN765 manufactured by BASF SE, Adekastab LA-52 and LA-72 manufactured by ADEKA CORPORATION, and JF-95 manufactured by JOHOKU CHEMICAL CO., LTD.

(Bluing Agent)

Examples of the bluing agent include a bluing agent which has an absorption band in the wavelength range from orange color to yellow color in the visible light region and has a function of adjusting the color of an optical material comprised of a resin. More specifically, the bluing agent includes a substance which displays from blue color to violet color.

The polymerizable composition for optical materials can be obtained by mixing the polythiol (A), the polyisocyanate (B), and the ultraviolet absorber (C), and, as necessary, another thiol compound, a catalyst, an internal mold release agent, or other additives, by a predetermined method.

The temperature at the time of mixing is typically 25° C. or lower. There are cases in which the temperature is preferably a lower temperature from the viewpoint of a pot life of the polymerizable composition for optical materials. Here, in a case where the solubility of the catalyst, the internal mold release agent, and the additives in the polythiol (A) and the polyisocyanate (B) is not good, it is also possible to dissolve by heating in advance.

The mixing order or the mixing method of respective components in the composition is not particularly limited as long as the respective components can be homogeneously mixed by the mixing order or the mixing method, and the mixing can be performed by a known method. Examples of the known method include a method in which a master batch including a predetermined amount of additives is prepared, and the master batch is dispersed and dissolved in a solvent.

<Molded Product>

In the present embodiment, a process for producing a thiourethane-based molded product is not particularly limited, but preferable examples of the manufacturing method include cast-polymerization. First, the polymerizable composition for optical materials is injected between molds held using a gasket, a tape, or the like. At this time, there are many cases where a degassing treatment under reduced pressure, a filtration treatment such as pressurization or depressurization, or the like is preferably performed, as necessary, depending on properties that obtained plastic lenses require.

Since polymerization conditions significantly vary depending on the kinds and amounts of polymerizable composition for optical materials and the catalyst used, the shape of the mold, and the like, the polymerization conditions are not limited, but, approximately, polymerization is performed at a temperature of −50° C. to 150° C. for 1 hour to 50 hours. Depending on cases, the polymerizable composition is preferably held in a temperature range of 10° C. to 150° C. or slowly heated, and cured for 1 hour to 25 hours.

The thiourethane-based molded product of the present embodiment may be subjected to an annealing treatment and the like as necessary. The treatment is performed typically at a temperature in a range of 50° C. to 150° C., and preferably performed at a temperature in a range of 90° C. to 140° C., and more preferably performed at a temperature in a range of 100° C. to 130° C.

The thiourethane-based molded product of the present embodiment can be obtained as molded bodies having various shapes by changing molds at the time of cast-polymerization.

The thiourethane-based molded product of the present embodiment has a high refractive index and high transparency, can has in a desired shape, and can be used as various optical materials by providing a coating layer formed as necessary, other members, or the like.

<Optical Materials>

Examples of the optical materials of the present embodiment include a plastic lens, a camera lens, a light emitting diode (LED), a prism, an optical fiber, an information recording substrate, a filter, and a light emitting diode. In particular, the thiourethane-based molded product of the present embodiment is suitable as optical materials and optical elements such as a plastic lens, a camera lens, and a light emitting diode.

Plastic lenses comprised of the thiourethane-based molded product of the present embodiment may be provided with a coating layer on a single surface or both surfaces thereof as necessary, and then used. Examples of the coating layer include a primer layer, a hard coating layer, an antireflection film layer, an antifog coated film layer, an antifouling layer, a water-repellent layer and the like. It is possible to solely use each of the above coating layers, or it is possible to use after multilayering a plurality of coating layers. In a case where the coating layers are provided on both surfaces, similar coating layers may be provided on the respective surfaces, or different coating layers may be provided.

In these coating layers, an infrared absorber for the purpose of protecting eyes from infrared rays, a light stabilizer or an antioxidant for the purpose of improving weather resistance of lenses, a stain or a pigment, furthermore, a photochromic stain or a photochromic pigment for the purpose of improving fashionability of lenses, an antistatic agent, and other known additives for enhancing performances of lenses may be used in combination. A coat layer such as a hard coat or an antireflection coat, or a primer layer may be provided.

The plastic lenses comprised of the thiourethane-based molded product of the present embodiment may be stained by using a purpose-oriented pigment for the purpose of imparting fashionability, photochromic properties, or the like, and then used. Lenses can be stained by a known staining method.

The present invention has been described above on the basis of the present embodiment, but various configurations other than that described above can be employed within a range not impairing the effects of the present invention.

EXAMPLES

Hereinafter, the present invention will be specifically described based on Examples, but the present invention is not limited thereto. In resin performance tests, a refractive index, an Abbe number, and heat resistance (Tg) were evaluated by the following methods.

The refractive index (ne) and the Abbe number (ve): measurement was performed at 20° C. using a Pulfrich refractometer.

eat resistance: the glass transition temperature (Tg) was measured using a TMA penetration method (a load of 50 g, 0.5 mmφ at the tip of a pin, a temperature raising rate of 10° C./min).

Measurement method of light transmittance: measurement of an ultraviolet-visible light spectrum was performed using a plastic lens having a thickness of 2 mm using a Shimadzu spectrophotometer UV-1600 manufactured by Shimadzu Corporation as a measuring device.

Example 1

0.10 parts by weight of ZelecUN (manufactured by Stepan Company), 1.0 parts by weight of 2-(2-hydroxy-3-t-butyl-5-methylphenyl)-chlorobenzotriazole (product name TINUVIN326 manufactured by BASF SE, maximum absorption wavelength of 352 nm), and 52.95 parts by weight of a mixture of 2,5-bis(isocyanatomethyl)-bicyclo [2.2.1] heptane and 2,6-bis(isocyanatomethyl)-bicyclo [2.2.1] heptane were mixed by stirring at 20° C., whereby a homogeneous solution was obtained. 47.05 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and 0.05 parts by weight of dimethyl tin(II) dichloride were added to the homogeneous solution, and the resultant product was mixed by stirring at 20° C., whereby a mixed solution was obtained. The mixed solution was defoamed at 400 Pa for 1 hour, then, filtered using a PTFE filter having a pore size of 1 μm, and injected into a molding tool formed of glass molds and tape. The mold die was put into a polymerization oven, and slowly heated from 25° C. to 120° C. for 21 hours so as to polymerize the solution. After the polymerization ended, the mold die was taken out from the oven. The obtained molded product was further subjected to an annealing treatment at 120° C. for 2 hours. The obtained molded product was transparent, and had a refractive index (ne) of 1.62, an Abbe number (ve) of 39, and heat resistance of 126° C., which indicated that the composition was suitable as a transparent resin for optical materials. An ultraviolet-visible light spectrum of the obtained molded product was measured by using a spectrophotometer UV-1600 (manufactured by Shimadzu Corporation). The evaluation results are shown in Table-1.

Example 2

0.10 parts by weight of ZelecUN (manufactured by Stepan Company), 0.8 parts by weight of 2-(2-hydroxy-3-t-butyl-5-methylphenyl)-chlorobenzotriazole (product name TINUVIN326 manufactured by BASF SE, maximum absorption wavelength of 352 nm), 44.8 parts by weight of isophorone diisocyanate, and 8.7 parts by weight of hexamethylene diisocyanate were mixed by stirring at 20° C., whereby a homogeneous solution was obtained. 46.5 parts by weight of a mixture of 5,7-dimercaptomethyl-1,11-dimercapto-3,6,9-trithiaundecane, 4,7-dimercaptomethyl-1, 11-dimercapto-3,6,9-trithiaundecane, and 4,8-dimercaptomethyl-1,11-dimercapto-3,6,9-trithiaundecane, and 0.05 parts by weight of dimethyl tin(II) dichloride were added to the homogeneous solution, and the resultant product was mixed by stirring at 20° C., whereby a mixed solution was obtained. The mixed solution was defoamed at 400 Pa for 1 hour, then, filtered using a PTFE filter having a pore size of 1 μm, and injected into a molding tool formed of glass molds and tape. The mold die was put into a polymerization oven, and slowly heated from 25° C. to 120° C. for 21 hours so as to polymerize the solution. After the polymerization ended, the mold die was taken out from the oven. The obtained molded product was further subjected to an annealing treatment at 120° C. for 2 hours. The obtained molded product was transparent, and had a refractive index (ne) of 1.62, an Abbe number (ve) of 38, and heat resistance of 128° C., which indicated that the composition was suitable as a transparent resin for optical materials. An ultraviolet-visible light spectrum of the obtained molded product was measured by using a spectrophotometer UV-1600 (manufactured by Shimadzu Corporation). The evaluation results are shown in Table-1.

Example 3

0.10 parts by weight of ZelecUN (manufactured by Stepan Company), 0.5 parts by weight of 2-(2-hydroxy-3-t-butyl-5-methylphenyl)-chlorobenzotriazole (product name TINUVIN326 manufactured by BASF SE, maximum absorption wavelength of 352 nm), and 50.6 parts by weight of m-xylylene diisocyanate were mixed by stirring at 20° C., whereby a homogeneous solution was obtained. 49.4 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and 0.01 parts by weight of dibutyl tin(II) dichloride were added to the homogeneous solution, and the resultant product was mixed by stirring at 20° C., whereby a mixed solution was obtained. The mixed solution was defoamed at 400 Pa for 1 hour, then, filtered using a PTFE filter having a pore size of 1 μm, and injected into a molding tool formed of glass molds and tape. The mold die was put into a polymerization oven, and slowly heated from 25° C. to 120° C. for 21 hours so as to polymerize the solution. After the polymerization ended, the mold die was taken out from the oven. The obtained molded product was further subjected to an annealing treatment at 120° C. for 2 hours. The obtained molded product was transparent, and had a refractive index (ne) of 1.67, an Abbe number (ve) of 31, and heat resistance of 98° C., which indicated that the composition was suitable as a transparent resin for optical materials. An ultraviolet-visible light spectrum of the obtained molded product was measured using a spectrophotometer UV-1600 (manufactured by Shimadzu Corporation). The evaluation results are shown in Table-1.

Example 4

0.10 parts by weight of ZelecUN (manufactured by Stepan Company), 0.8 parts by weight of 2-(2-hydroxy-3-t-butyl-5-methylphenyl)-chlorobenzotriazole (product name TINUVIN326 manufactured by BASF SE, maximum absorption wavelength of 352 nm), 28.45 parts by weight of isophorone diisocyanate, and 21.5 parts by weight of hexamethylene diisocyanate were mixed by stirring at 20° C., whereby a homogeneous solution was obtained. 37.55 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 12.5 parts by weight of pentaerythritol tetrakis(3-mercaptopropionate), and 0.05 parts by weight of dimethyl tin(II) dichloride were added to the homogeneous solution, and the resultant product was mixed by stirring at 20° C., whereby a mixed solution was obtained. The mixed solution was defoamed at 400 Pa for 1 hour, then, filtered using a PTFE filter having a pore size of 1 μm, and injected into a molding tool formed of glass molds and tape. The mold die was put into a polymerization oven, and slowly heated from 25° C. to 120° C. for 21 hours so as to polymerize the solution. After the polymerization ended, the mold die was taken out from the oven. The obtained molded product was further subjected to an annealing treatment at 120° C. for 2 hours. The obtained molded product was transparent, and had a refractive index (ne) of 1.60, an Abbe number (ve) of 39, and heat resistance of 102° C., which indicated that the composition was suitable as a transparent resin for optical materials. An ultraviolet-visible light spectrum of the obtained molded product was measured using a spectrophotometer UV-1600 (manufactured by Shimadzu Corporation). The evaluation results are shown in Table-1.

Comparative Example 1

A molded product was obtained in the same manner as in Example 1 except that 4-mercaptomethyl-1,8-dimercapto-3,6-dithiaoctane was used instead of the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane. The obtained molded product was transparent, and had a refractive index (ne) of 1.62, an Abbe number (ve) of 38, and heat resistance of 113° C. An ultraviolet-visible light spectrum of the obtained molded product was measured using a spectrophotometer UV-1600 (manufactured by Shimadzu Corporation). The evaluation results are shown in Table-1.

Comparative Example 2

A molded product was obtained in the same manner as in Example 3 except that 4-mercaptomethyl-1,8-dimercapto-3,6-dithiaoctane was used instead of the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane. The obtained molded product was transparent, and had a refractive index (ne) of 1.67, an Abbe number (ve) of 31, and heat resistance of 84° C. An ultraviolet-visible light spectrum of the obtained molded product was measured using a spectrophotometer UV-1600 (manufactured by Shimadzu Corporation). The evaluation results are shown in Table-1.

Comparative Example 3

0.10 parts by weight of ZelecUN (manufactured by Stepan Company), 0.05 parts by weight of 2-(2'-hydroxy-5'-t-octylphenyl) benzotriazole (product name BIOSORB 583 manufactured by KYODO CHEMICAL CO., LTD., maximum absorption wavelength of 340 nm), and 52.95 parts by weight of a mixture of 2,5-bis(isocyanatomethyl)-bicyclo[2.2.1] heptane and 2,6-bis(isocyanatomethyl)-bicyclo

[2.2.1] heptane were mixed by stirring at 20° C., whereby a homogeneous solution was obtained. 47.05 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and 0.05 parts by weight of dimethyl tin(II) dichloride were added to the homogeneous solution, and the resultant product was mixed by stirring at 20° C., whereby a mixed solution was obtained. The mixed solution was defoamed at 400 Pa for 1 hour, then, filtered using a PTFE filter having a pore size of 1 µm, and injected into a molding tool formed of glass molds and tape. The mold die was put into a polymerization oven, and slowly heated from 25° C. to 120° C. for 21 hours so as to polymerize the solution. After the polymerization ended, the mold die was taken out from the oven. The obtained molded product was further subjected to an annealing treatment at 120° C. for 2 hours. The obtained molded product was transparent, and had a refractive index (ne) of 1.62, an Abbe number (ve) of 41, and heat resistance of 130° C., which indicated that the composition was suitable as a transparent resin for optical materials. An ultraviolet-visible light spectrum of the obtained molded product was measured using a spectrophotometer UV-1600 (manufactured by Shimadzu Corporation). The evaluation results are shown in Table-1.

Comparative Example 4

A molded product was obtained in the same manner as in Comparative Example 3 except that 1.5 parts by weight of 2-(2'-hydroxy-5'-t-octylphenyl) benzotriazole (maximum absorption wavelength of 340 nm) was used instead of 0.05 parts by weight thereof. The obtained molded product was transparent, and had a refractive index (ne) of 1.62, an Abbe number (ve) of 40, and heat resistance of 125° C., which indicated that the composition was suitable as a transparent resin for optical materials. An ultraviolet-visible light spectrum of the obtained molded product was measured using a spectrophotometer UV-1600 (manufactured by Shimadzu Corporation). The evaluation results are shown in Table-1.

Comparative Example 5

A molded product was obtained in the same manner as in Comparative Example 3 except that 4-mercaptomethyl-1,8-dimercapto-3,6-dithiaoctane was used instead of the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane. The obtained molded product was transparent, and had a refractive index (ne) of 1.62, an Abbe number (ve) of 39, and heat resistance of 116° C. An ultraviolet-visible light spectrum of the obtained molded product was measured using a spectrophotometer UV-1600 (manufactured by Shimadzu Corporation). The evaluation results are shown in Table-1.

Comparative Example 6

A molded product was obtained in the same manner as in Comparative Example 3 except that 1.5 parts by weight of 2-(2'-hydroxy-5'-t-octylphenyl) benzotriazole (maximum absorption wavelength of 340 nm) was used instead of 0.05 parts by weight thereof, and 4-mercaptomethyl-1,8-dimercapto-3,6-dithiaoctane was used instead of the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane. The obtained molded product was transparent, and had a refractive index (ne) of 1.62, an Abbe number (ve) of 38, and heat resistance of 112° C. An ultraviolet-visible light spectrum of the obtained molded product was measured using a spectrophotometer UV-1600 (manufactured by Shimadzu Corporation). The evaluation results are shown in Table-1.

TABLE 1

|  | Polyisocyanate | Polythiol | Ultraviolet absorber (amount added) | ne | ve | Tg [° C.] | 420 nm Transmittance [%] |
| --- | --- | --- | --- | --- | --- | --- | --- |
| Example 1 | i-1 | t-1 | TINUVIN326 (10000 ppm) | 1.62 | 39 | 126 | 11.4 |
| Example 2 | i-2/i-3 | t-1 | TINUVIN326 (8000 ppm) | 1.62 | 38 | 128 | 12.7 |
| Example 3 | i-4 | t-1 | TINUVIN326 (5000 ppm) | 1.67 | 31 | 98 | 20.3 |
| Example 4 | i-2/i-3 | t-1/t-3 | TINUVIN326 (8000 ppm) | 1.60 | 39 | 102 | 12.5 |
| Comparative Example 1 | i-1 | t-2 | TINUVIN326 (10000 ppm) | 1.62 | 38 | 113 | 17.1 |
| Comparative Example 2 | i-4 | t-2 | TINUVIN326 (5000 ppm) | 1.67 | 31 | 84 | 25.3 |
| Comparative Example 3 | i-1 | t-1 | BIOSORB 583 (500 ppm) | 1.62 | 41 | 130 | 87.8 |
| Comparative Example 4 | i-1 | t-1 | BIOSORB 583 (15000 ppm) | 1.62 | 40 | 125 | 83.3 |
| Comparative Example 5 | i-1 | t-2 | BIOSORB 583 (500 ppm) | 1.62 | 39 | 116 | 88.4 |
| Comparative Example 6 | i-1 | t-2 | BIOSORB 583 (15000 ppm) | 1.62 | 38 | 112 | 83.8 | i-1: a mixture of 2,5-bis(isocyanatomethyl)-bicyclo[2.2.1]heptane and 2,6-bis(isocyanatomethyl)-bicyclo[2.2.1]heptane i-2: isophorone diisocyanate i-3: hexamethylene diisocyanate i-4: m-xylylene diisocyanate t-1: a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane t-2: 4-mercaptomethyl-1,8-dimercapto-3,6-dithiaoctane
t-3: pentaerythritol tetrakis(3-mercaptopropionate)

From the results of Comparative Examples 3 to 6, the molded bodies obtained from "the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane" or "4-mercaptomethyl-1,8-dimercapto-3,6-dithiaoctane" which is a thiol compound having a similar molecular structure is used as a thiol, the same kind of polyisocyanate, and BIOSORB 583 (maximum absorption wavelength of 340 nm) which is an ultraviolet absorber which had been used in the related art exhibited substantially matching results in a refractive index, an Abbe number, and light transmittance. That is, in a case where BIOSORB 583 was used, the difference in optical characteristics between these thiol compounds was not observed.

On the other hand, as apparent from comparison between Example 1 and Comparative Example 1, and Example 3 and Comparative Example 2, surprisingly, in a case where a specific ultraviolet absorber (Tinubin326) was used as an ultraviolet absorber, it was found that the refractive indexes, the Abbe numbers, and the transparencies were the same respectively, but the transmittance of blue light having a wavelength of 420 nm was low, and transmission of harmful blue light was effectively suppressed, compared to a case where "the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane" or "4-mercaptomethyl-1,8-dimercapto-3,6-dithiaoctane" was used as a polythiol.

By using the polymerizable composition for optical materials of the present invention, an optical material which can effectively suppress transmission of blue light having a wavelength of about 420 nm is obtained. In addition, optical materials obtained using the polymerizable composition for optical materials of the present invention are excellent in terms of optical characteristics such as a refractive index, releasability, transparency, and heat resistance, and are also excellent in terms of balance among the above characteristics.

The polymerizable composition for optical materials of the present invention can be suitably used to obtain resins for optical materials which require a high refractive index and high transparency, and, in particular, as plastic lenses for eyeglasses.

Priority is claimed on Japanese Patent Application No. 2013-258501, filed on Dec. 13, 2013, PCT International Application No. PCT/JP2014/054971, filed on Feb. 27, 2014, and Japanese Patent Application No. 2014-171791, filed on Aug. 26, 2014, the contents of which are incorporated herein by reference.

The invention claimed is:

1. A polymerizable composition for optical materials, comprising:
   (A) at least one kind of polythiols selected from 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane;
   (B) polyisocyanate; and
   (C) a chloro-substituted benzotriazole-based compound which is 2-(2-hydroxy-3-t-butyl-5-methylphenyl)-chlorobenzotriazole,
   wherein 0.1% by weight to 1.5% by weight of the chloro-substituted benzotriazole-based compound (C) is included in 100% by weight of the polymerizable composition for optical materials.

2. A molded product obtained by heat-curing the polymerizable composition for optical materials according to claim 1.

3. An optical material comprised of the molded product according to claim 2.

4. A plastic lens comprised of the optical material according to claim 3.

5. A process for producing optical materials comprising:
   a step of cast-polymerizing the polymerizable composition for optical materials according to claim 1.

* * * * *